US008086879B2

(12) United States Patent
Hady

(10) Patent No.: US 8,086,879 B2
(45) Date of Patent: Dec. 27, 2011

(54) POWERING ON DEVICES VIA INTERMEDIATE COMPUTING DEVICE

(75) Inventor: Frank T. Hady, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 601 days.

(21) Appl. No.: 12/006,248

(22) Filed: Dec. 31, 2007

(65) Prior Publication Data

US 2009/0172433 A1 Jul. 2, 2009

(51) Int. Cl.
*G06F 1/26* (2006.01)
*G06F 1/32* (2006.01)

(52) U.S. Cl. ......... 713/310; 713/320; 713/324; 713/340

(58) Field of Classification Search .................... 713/320
See application file for complete search history.

(56) References Cited

U.S. PATENT DOCUMENTS

| 7,107,442 B2 * | 9/2006 | Cheshire ............................ 713/1 |
| 2006/0067357 A1 * | 3/2006 | Rader ............................ 370/463 |
| 2006/0075269 A1 * | 4/2006 | Liong et al. .................... 713/300 |

* cited by examiner

*Primary Examiner* — Ryan Stiglic
(74) *Attorney, Agent, or Firm* — Caven & Aghevli LLC

(57) ABSTRACT

Methods and apparatus relating to powering on devices via an intermediate computing device are described. In an embodiment, a request for data by a first device may be detected at a second device. The second device may determine a third device that stores the requested data and cause it to be turned on if the third device is in a reduced power consumption state. Other embodiments are also disclosed.

19 Claims, 4 Drawing Sheets

US 8,086,879 B2

POWERING ON DEVICES VIA INTERMEDIATE COMPUTING DEVICE

FIELD

The present disclosure generally relates to the field of electronics. More particularly, an embodiment of the invention generally relates to powering on devices via an intermediate computing device.

BACKGROUND

Networking has become an integral part of computing. Networks may generally be used to share data between computing devices. One such use is share data stored on several different devices connected to a network. However, to share data, the devices involved (i.e., a source device and a destination device) will need to be turned on. As the number of devices coupled to a network grows, the overall power consumption also increases. Some current implementations may allow for one device to turn on another device connected to the same network, for example, through a WoL (Wake on LAN (Local Area Network)) feature. However, the source and destination devices need to be enabled to support WoL. Hence, devices without WoL support may need to be left turned on at all times or rely on manual power control operated by a person. These may be unacceptable solutions as networking becomes a more integral part of computing.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures may indicate similar items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some embodiments discussed herein may allow for a plurality of devices coupled via one or more communication channels (such as private channels or private channels) to share data while supporting a low power implementation (e.g., where devices not in use may enter a reduced power consumption state, such as a suspend or sleep mode). Such techniques may be used with devices that do not support a common power-on capability (such as WoL). For example, devices coupled to a network (such as a network in a home) may act as distributed media storage and playback with reduced power consumption when such devices are not in use.

In an embodiment, a first device (e.g., a data storage device) may be turned on in response to a data request from a second device (e.g., a media player) through the use of a third device (e.g., a personal computer (PC)). The third device may translate the request into both a wakeup message and a data request. In one embodiment, the device storing the data may support WoL, but the requesting device may or may not support WOL. In such an embodiment, an intermediate device (e.g., a PC) may act as the translator to translate the request into: first a WoL wake up message, then a request for the data. In another embodiment the device storing the data may be turned on with a Radio Frequency (RF) or infrared "remote" signal, but the requesting device may or may not include the necessary transmitter. In some embodiments the intermediate device may always be powered. In others, the intermediate device may be allowed to turn off, but have an exclusive wake up feature or other general network activity monitor allowing it to wake in response to different types of requests (even when the request is directed to a third party in some embodiments).

Figure 1:
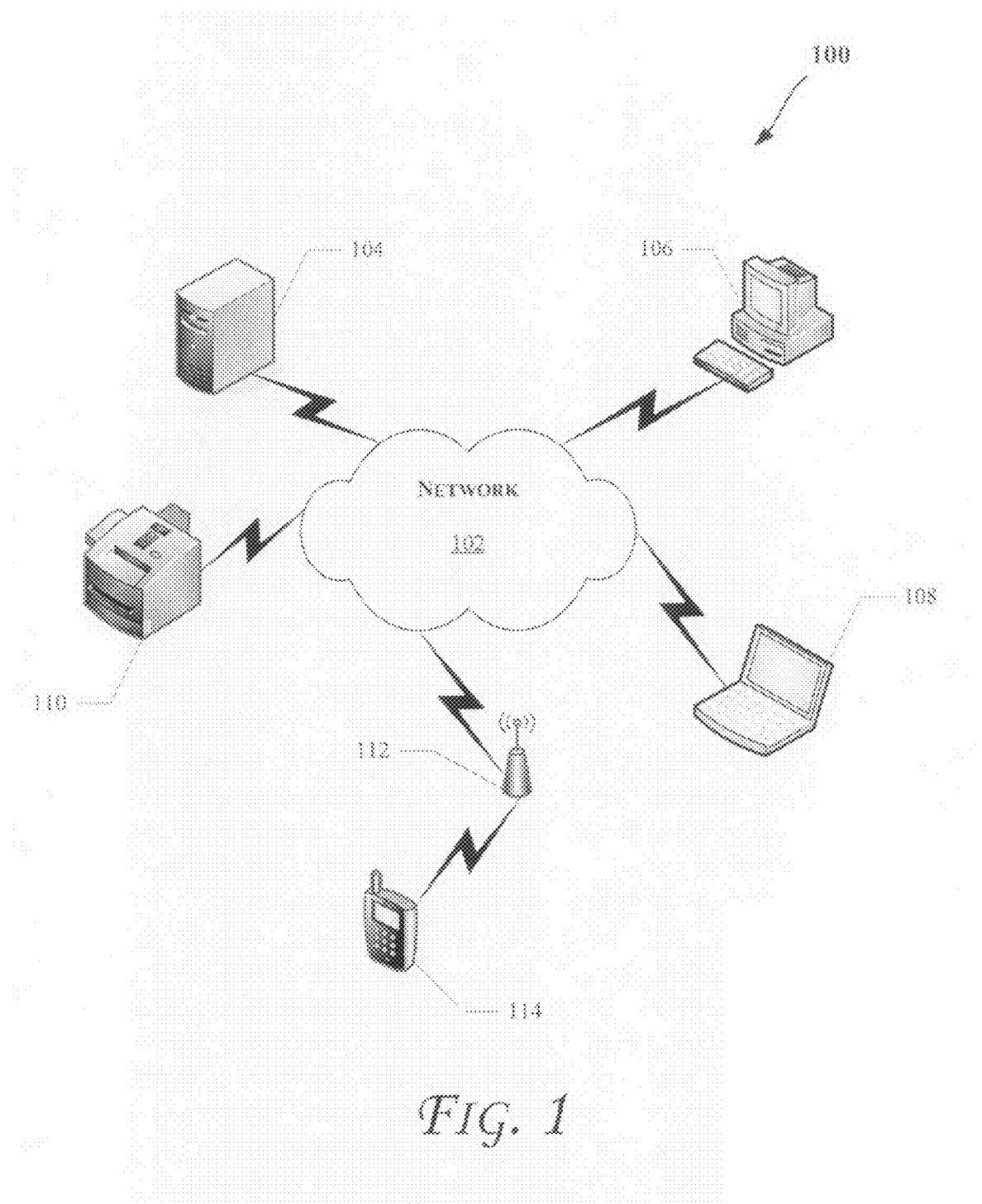
FIG. 1 illustrates various components of an embodiment of a networking environment, which may be utilized to implement various embodiments discussed herein.

FIG. 1 illustrates various components of an embodiment of a networking environment 100, which may be utilized to implement various embodiments discussed herein. The environment 100 may include a network 102 to enable communication between various devices such as a server computer 104, a desktop computer 106 (e.g., a workstation or a desktop computer), a laptop (or notebook) computer 108, a reproduction device 110 (e.g., a network printer, copier, facsimile, scanner, all-in-one device, etc.), a wireless access point 112, a personal digital assistant or smart phone 114, a rack-mounted computing system (not shown), a set top box, a digital picture frame, an Ultra Mobile Device (UMD), etc. The network 102 may be any type of a computer network including an intranet, the Internet, and/or combinations thereof.

The devices 104-114 may be coupled to the network 102 through wired and/or wireless connections. Hence, the network 102 may be a wired and/or wireless network. For example, as illustrated in FIG. 1, the wireless access point 112 may be coupled to the network 102 to enable other wireless-capable devices (such as the device 114) to communicate with the network 102. In one embodiment, the wireless access point 112 may include traffic management capabilities. Also, data communicated between the devices 104-114 may be encrypted (or cryptographically secured), e.g., to limit unauthorized access. In addition the network coupling the devices may be composed of a combination of a data network, used to transmit information, and a control network, used to control simple attributes of devices, like power state.

The network 102 may utilize any type of communication protocol such as Ethernet, Fast Ethernet, Gigabit Ethernet, wide-area network (WAN), fiber distributed data interface (FDDI), Token Ring, leased line, analog modem, digital subscriber line (DSL and its varieties such as high bit-rate DSL (HDSL), integrated services digital network DSL (IDSL), etc.), asynchronous transfer mode (ATM), cable modem, and/or FireWire.

Wireless communication through the network 102 may be in accordance with one or more of the following: wireless local area network (WLAN), wireless wide area network (WWAN), code division multiple access (CDMA) cellular radiotelephone communication systems, global system for mobile communications (GSM) cellular radiotelephone systems, North American Digital Cellular (NADC) cellular radiotelephone systems, time division multiple access (TDMA) systems, extended TDMA (E-TDMA) cellular radiotelephone systems, third generation partnership project (3G) systems such as wide-band CDMA (WCDMA), etc. Moreover, network communication may be established by internal network interface devices (e.g., present within the same physical enclosure as a computing system) or external network interface devices (e.g., having a separate physical enclosure and/or power supply than the computing system to which it is coupled) such as a network interface card or controller (NIC).

Figure 2:
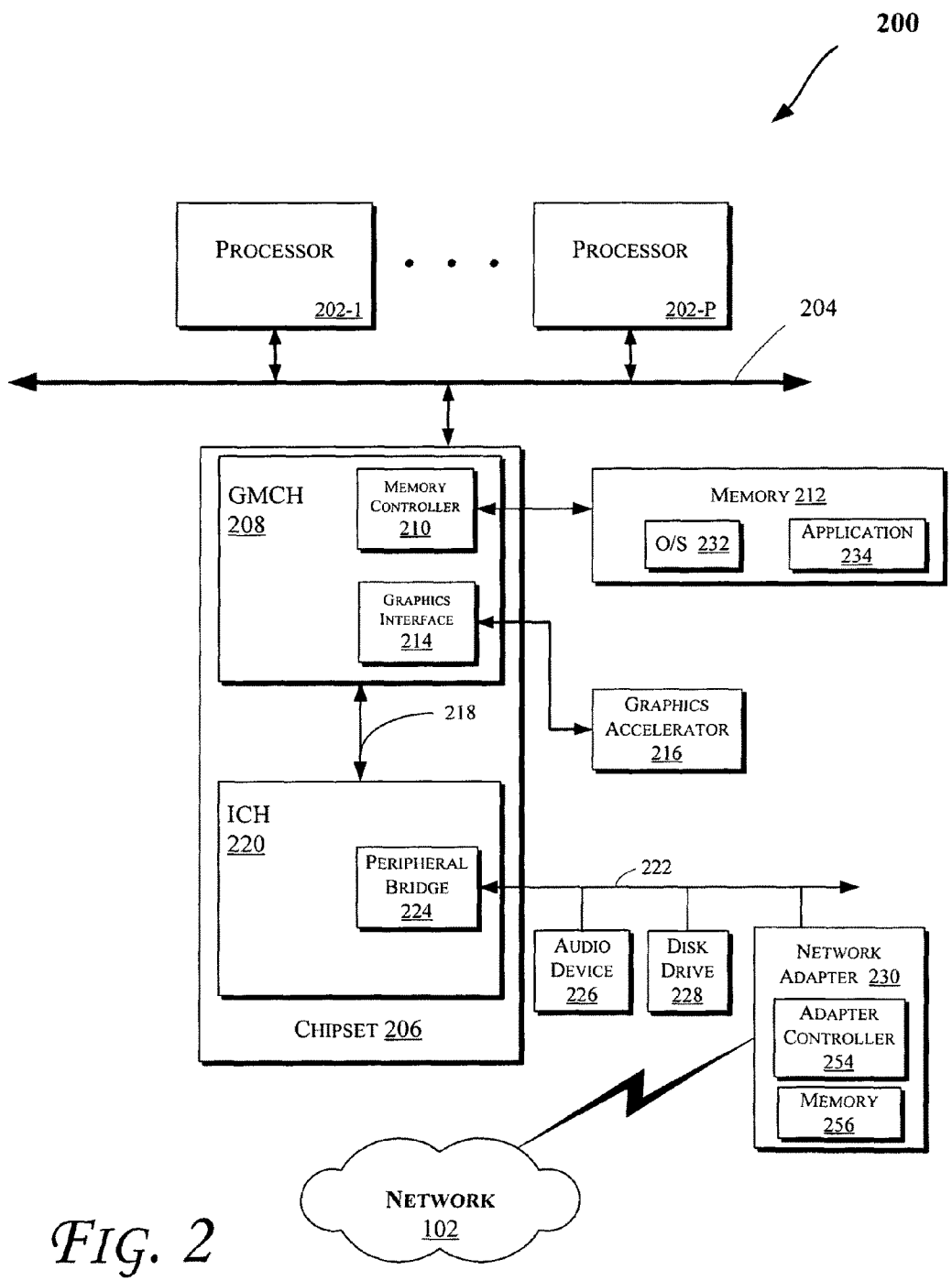
FIGS. 2 and 4 illustrate block diagrams of embodiments of computing systems, which may be utilized to implement some embodiments discussed herein.

FIG. 2 illustrates a block diagram of a computing system 200 in accordance with an embodiment of the invention. The computing system 200 may include one or more central processing unit(s) (CPUs) or processors 202-1 through 202-P (which may be referred to herein as "processors 202" or "processor 202"). The processors 202 may communicate via an interconnection network (or bus) 204. The processors 202 may include a general purpose processor, a network processor (that processes data communicated over the computer network 102), or other types of a processor (including a reduced instruction set computer (RISC) processor or a complex instruction set computer (CISC)). Moreover, the processors 202 may have a single or multiple core design. The processors 202 with a multiple core design may integrate different types of processor cores on the same integrated circuit (IC) die. Also, the processors 202 with a multiple core design may be implemented as symmetrical or asymmetrical multiprocessors. In an embodiment, various operations discussed herein may be performed by one or more components of the system 200.

A chipset 206 may also communicate with the interconnection network 204. The chipset 206 may include a graphics memory control hub (GMCH) 208. The GMCH 208 may include a memory controller 210 that communicates with a main system memory 212. The memory 212 may store data, including sequences of instructions that are executed by the processor 202, or any other device included in the computing system 200. In one embodiment of the invention, the memory 212 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 204, such as multiple CPUs and/or multiple system memories.

The GMCH 208 may also include a graphics interface 214 that communicates with a graphics accelerator 216. In one embodiment of the invention, the graphics interface 214 may communicate with the graphics accelerator 216 via an accelerated graphics port (AGP). In an embodiment of the invention, a display (such as a flat panel display, a cathode ray tube (CRT), a projection screen, etc.) may communicate with the graphics interface 214 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 218 may allow the GMCH 208 and an input/output control hub (ICH) 220 to communicate. The ICH 220 may provide an interface to I/O devices that communicate with the computing system 200. The ICH 220 may communicate with a bus 222 through a peripheral bridge (or controller) 224, such as a peripheral component interconnect (PCI) bridge, a universal serial bus (USB) controller, or other types of peripheral bridges or controllers. The bridge 224 may provide a data path between the processor 202 and peripheral devices. Other types of topologies may be utilized. Also, multiple buses may communicate with the ICH 220, e.g., through multiple bridges or controllers. Moreover, other peripherals in communication with the ICH 220 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 222 may communicate with an audio device 226, one or more disk drive(s) 228, and one or more network interface device(s) 230 (which is in communication with the computer network 102 and may comply with one or more of the various types of communication protocols discussed with reference to FIG. 1). In an embodiment, the network interface device 230 may be a NIC. Other devices may communicate via the bus 222. Also, various components (such as the network interface device 230) may communicate with the GMCH 208 in some embodiments of the invention. In addition, the processor 202 and other components shown in FIG. 2 (including but not limited to the GMCH 208, one or more components of the GMCH 208 such as the memory controller 210, etc.) may be combined to form a single chip. Furthermore, a graphics accelerator may be included within the GMCH 208 in some embodiments of the invention.

Furthermore, the computing system 200 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 228), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 200 may be arranged in a point-to-point (PtP) configuration. For example, processors, memory, and/or input/output devices may be interconnected by a number of point-to-point interfaces.

As illustrated in FIG. 2, the memory 212 may include one or more of an operating system(s) (O/S) 232 or application(s) 234. The memory 212 may also store one or more device driver(s), packet buffers, descriptors (which may point to the buffers in some embodiments), network protocol stack(s), etc. to facilitate communication over the network 102. Programs and/or data in the memory 212 may be swapped into the disk drive 228 as part of memory management operations. The application(s) 234 may execute (on the processor(s) 202) to communicate one or more packets with one or more computing devices coupled to the network 102 (such as the devices 104-114 of FIG. 1). In an embodiment, a packet may be a sequence of one or more symbols and/or values that may be encoded by one or more electrical signals transmitted from at least one sender to at least on receiver (e.g., over a network such as the network 102). For example, each packet may include a header that includes various information, which may be utilized in routing and/or processing the packet, such as a source address, a destination address, packet type, etc. Each packet may also have a payload that includes the raw data (or content) the packet is transferring between various computing devices (e.g., the devices 104-114 of FIG. 1) over a computer network (such as the network 102).

In an embodiment, the network adapter 230 may include a network adapter controller 254, which may include hardware (e.g., logic circuitry) and/or a programmable processor (such as the processors 202) to perform adapter related operations. In an embodiment, the adapter controller 254 may be a MAC (media access control) component. The network adapter 230 may further include a memory 256, such as any type of volatile/nonvolatile memory, and may include one or more cache(s).

Figure 3:
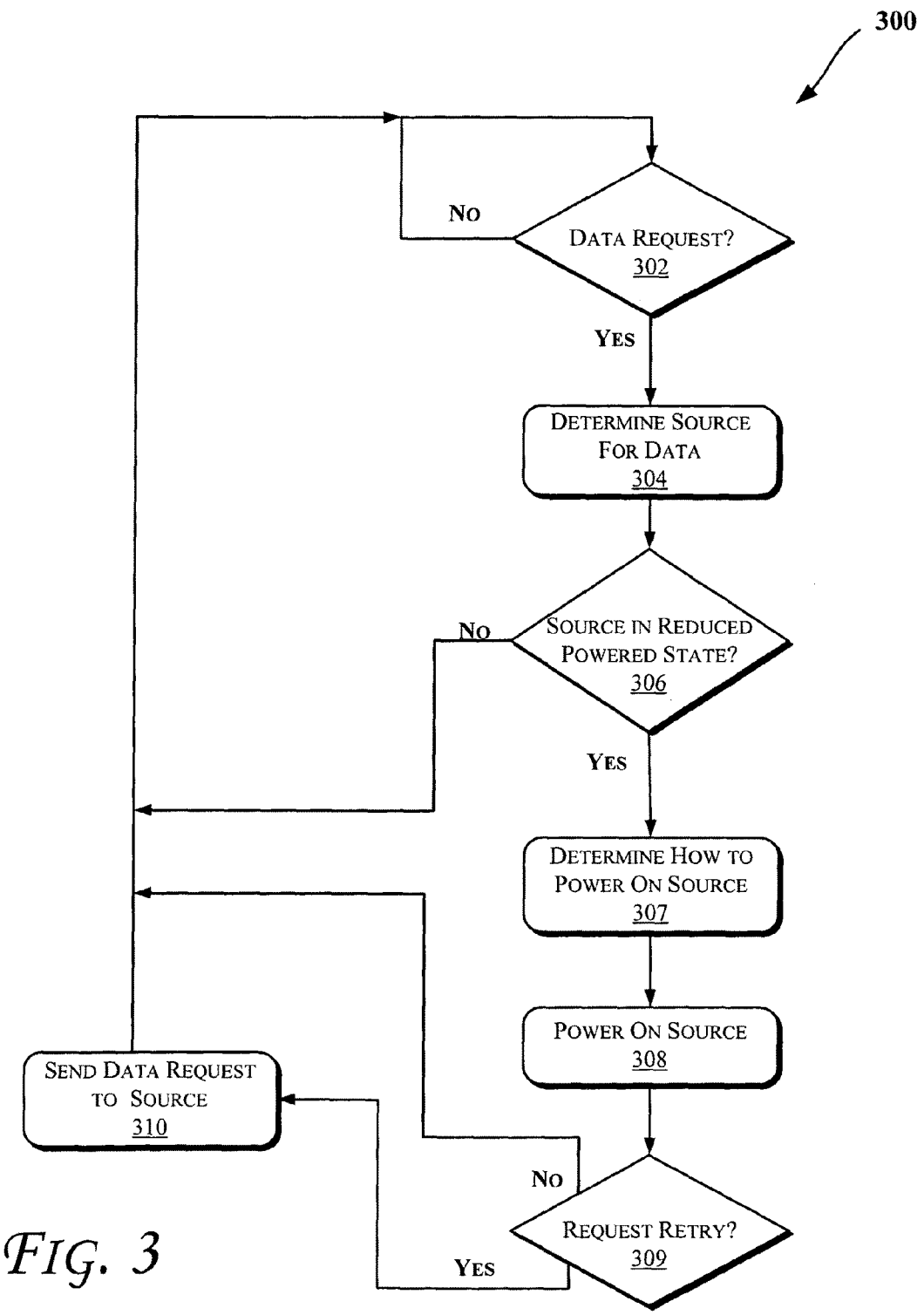
FIG. 3 illustrates a flow diagram in accordance with an embodiment of invention.

FIG. 3 illustrates a flow diagram of a method 300 to turn on a device via an intermediate device, according to an embodiment. In some embodiments, one or more of the components discussed with reference to FIGS. 1-2 and/or 4 may be used to perform one or more of the operations discussed with reference to FIG. 3.

Referring to FIGS. 1-3, at an operation 302 a request for data (e.g., originating from a requesting device to a source device) may be detected (e.g., at an intermediate device) which is not the intended recipient of the request. For example, a requesting device (such as a media player, display device, picture frame, UMD, sound bridge of a sound receiver, or other devices capable of playing back various types of media) may request some data (e.g., a music, video, image/picture file, etc.). The request may be sent over various types of channels (e.g., including private and/or shared channel(s)) such as those discussed herein, e.g., with reference to FIG. 1-2 or 4. Also, the request may cause the intermediate device to power on in some embodiments.

In an embodiment, the intermediate device that detects the request may be an aggregator device. For example, in at least some embodiments, a personal media aggregation may provide home users access to all of the documents, pictures, music, videos, etc. stored on all systems within their home from any system they are currently using. Access may be provided in the form of a simplified or single directory (or file structure) to which both users and existing applications are already accustomed. Moreover, in some embodiments, the same directory or file-tree view may be presented regardless of the system being used to access the media using existing and/or already deployed protocols and O/S software. Power may become an issue in such a configuration. In particular, all devices should be able to enter low power states (at least almost off such as sleep or suspend modes) when not in use.

At an operation 304, the source device for the data may be determined. Various types of computing devices may be in communication with the intermediate device that may be candidates for the source device, e.g., any device that is capable of storing data and sharing the stored data with other computing devices, such as a desktop computer, a server (e.g., a NAS (Network Attached Server), blade server, Digital Video Recorder, etc.), a mobile computing device (such as a laptop, a PDA, networked camera, etc.).

In an embodiment, the intermediate device may communicate with other devices (e.g., one or more source devices) coupled to the intermediate device prior to receipt of the data request at operation 302, e.g., to determine one or more of: the device power-on capabilities (such as WoL, any other pertinent event indicating a power-on request, etc.), identification of data stored on the source device(s), a shared protocol which may be used for communication (such as CIFS (Common Internet File System)), power state (turned on or turned off), etc. In one embodiment, the intermediate device may have access to a storage device that stores the information. The storage device may be local to the intermediate device or otherwise accessible through a communication channel such as a bus or network. For example, any of the storage devices discussed with reference to FIG. 2 or 4 may be used to store this information about the other devices (such as a network adapter memory (256), a main system memory (212), or a cache within a processor (202)).

In one embodiment, the intermediate device may intercept copies of all requests communicated over a shared network at operation 302 to detect requests that it should handle, e.g., as determined based on the store information. In one embodiment, the stored information may be communicated and stored prior to powering off the source device.

Figure 4:
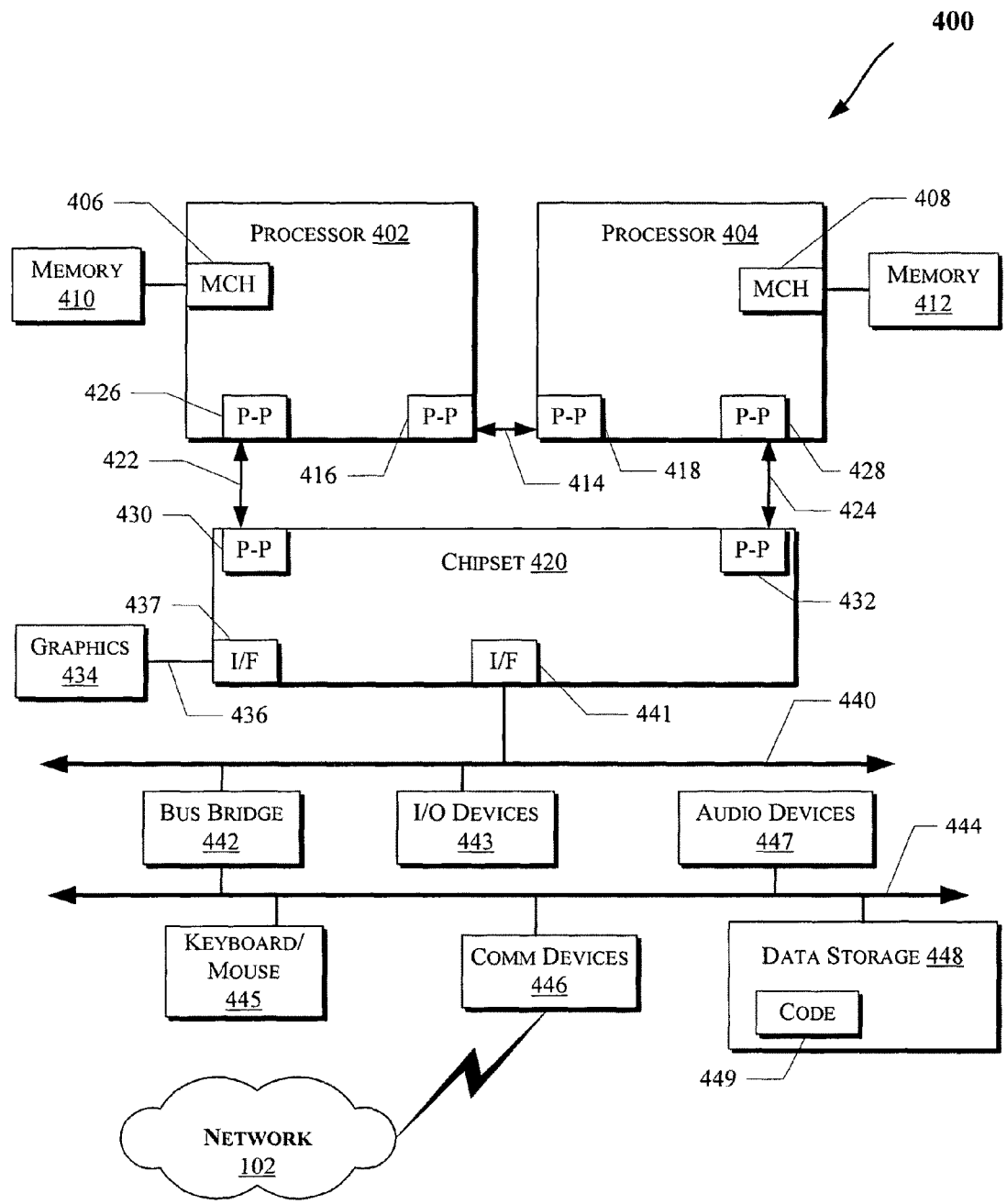

At an operation 306, it may be determined whether the source device is in a reduced power consumption state such as powered off, in sleep mode (e.g., where power is turned off to components of a computing system but may be maintained for at least volatile storage devices such as the memory 212 of FIG. 2 or memories 410/412 of FIG. 4), in suspend mode (e.g., where power is turned off to components of a computing system and data from volatile storage device(s) is stored in non-volatile memory), etc. As discussed herein, "powered off" or "power off" may be interchangeable with "turned off" or "turn off" respectively. Also, "powered on" or "power on" may be interchangeable with "turned on" or "turn on" respectively and generally correspond to a normal operating power consumption state. In one embodiment, the intermediate device may refer to the stored information to determine the status of the source device at operation 306. Alternatively, the intermediate device may communicate with the source device to determine the status at operation 306. At an operation 307, it may be determined (e.g., looked up) how the source device is to be powered on. At an operation 308, the intermediate device may cause the source device to power on, e.g., by sending a signal to the source device in accordance with the determination of operation 307. Alternatively, the decision in operation 306 may be skipped with the intermediate device causing transmission of a power on signal to the source device, e.g., for situations in which it may be needed, regardless of the initial power state of the source devices. In some embodiments, the intermediate device may control supply of power to one or more power devices (e.g., the intermediate device may itself act as a power switch or conditioner, or have control thereof).

At an operation 309, it may be determined whether the data request is to be retried (e.g., by the intermediate device based on a response or lack of response from the source device after the request to power on the source is initiated at operation 308, or based on the stored information regarding the source device discussed above). If no retry is required, method 300 may resume at operation 302. Otherwise, at an operation 310, the data request may be sent to the source (e.g., intermediate device may send the data request to the source device). In some embodiments, the request sent at operation 310 may be modified (e.g., based on a response from the source device or based on the stored information regarding the source device discussed above).

In some embodiments, the requested data may be transmitted by the source device (directly or indirectly, e.g., through the intermediate/aggregator device) to the requesting device. Alternatively, if the source is not in a reduced power consumption state (306), it may be determined whether the source is capable of handling the request of operation 302 directly (e.g., the source device has already received the request and is capable of handling the request). If so, no further operations may be performed to service the request by the intermediate device, as the source device is capable of transmitting the data to the requesting device.

Additionally, in some of the embodiments, the source device may operate in network "sniffer" mode, e.g., reading all packets sent across the network (for example, on a wireless network, or for a switched Ethernet network the translator device may connect to the switch spanning port). The source device may read requests distributed across the home network and identify those destined for media sources that it knows are, or may be, powered down. When it sees such a request the source device sends the proper wakeup message to the powered down device on behalf of the requesting device (or media destination). The source device may also resend the request for data with the original media destination listed as the source of the request, e.g., if the media source itself is not capable of retrying the request to the now powered on source device.

In one embodiment, logic in a computing system (such as the processors 202, adapter controller 254, etc.) may perform one or more of operations 302-310. Furthermore, each of the requesting, intermediate, or source devices discussed with reference to FIG. 3 may include one or more of the components discussed with reference to FIGS. 2 and/or 4. Also, the requesting, intermediate, or source devices discussed with reference to FIG. 3 may correspond to any of the devices 104-114 of FIG. 1. Moreover, the requesting, intermediate, and source devices may be coupled in various ways such as through a shared communication channel (e.g., network 102), a private communication channel (e.g., a direct wire, personal wireless network (e.g., a Bluetooth connection), etc.), or a control network (e.g., RF or infrared remote control connection). Additionally, same or different channels may couple each pair of the requesting, intermediate, or source devices.

FIG. 4 illustrates a computing system 400 that is arranged in a point-to-point (PtP) configuration, according to an embodiment of the invention. In particular, FIG. 4 shows a system where processors, memory, and input/output devices are interconnected by a number of point-to-point interfaces. The operations discussed with reference to FIGS. 1-3 may be performed by one or more components of the system 400.

As illustrated in FIG. 4, the system 400 may include several processors, of which only two, processors 402 and 404 are shown for clarity. The processors 402 and 404 may each include one or more of the caches 264 and/or logic 263. The memories 410 and/or 412 may store various data such as those discussed with reference to the memory 212 of FIG. 4.

In an embodiment, the processors 402 and 404 may be one of the processors 402 discussed with reference to FIG. 4. The processors 402 and 404 may exchange data via a point-to-point (PtP) interface 414 using PtP interface circuits 416 and 418, respectively. Further, the processors 402 and 404 may include a high speed (e.g., general purpose) I/O bus channel in some embodiments of the invention to facilitate communication with various components (such as I/O device(s)). Also, the processors 402 and 404 may each exchange data with a chipset 420 via individual PtP interfaces 422 and 424 using point-to-point interface circuits 426, 428, 430, and 432. The chipset 420 may further exchange data with a graphics circuit 434 via a graphics interface 436, e.g., using a PtP interface circuit 437.

At least one embodiment of the invention may utilize the processors 402 and 404 to perform various operations, such as those discussed herein, e.g., with reference to FIGS. 1-3. Other embodiments of the invention, however, may exist in other circuits, logic units, or devices within the system 400 of FIG. 4. Furthermore, other embodiments of the invention may be distributed throughout several circuits, logic units, or devices illustrated in FIG. 4.

The chipset 420 may communicate with a bus 440 using a PtP interface circuit 441. The bus 440 may communicate with one or more devices, such as a bus bridge 442 and I/O devices 443. Via a bus 444, the bus bridge 442 may communicate with other devices such as a keyboard/mouse 445, communication devices 446 (such as modems, network interface devices, or other communication devices that may communicate with the computer network 102, including for example, the network adapter 230 of FIG. 2), audio I/O device 447, and/or a data storage device 448. The data storage device 448 may store code 449 that may be executed by the processors 402 and/or 404.

In various embodiments of the invention, the operations discussed herein, e.g., with reference to FIGS. 1-4, may be implemented as hardware (e.g., logic circuitry), software, firmware, or any combinations thereof, which may be provided as a computer program product, e.g., including a machine-readable or computer-readable medium having stored thereon instructions (or software procedures) used to program a computer (e.g., including a processor) to perform a process discussed herein. The machine-readable medium may include a storage device such as those discussed herein.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
   a storage device to store information corresponding to one or more sources of data;
   a communication adapter to receive a first data request from a first device; and
   logic to determine a second device that stores data corresponding to the first data request based on the stored information, wherein the logic is to translate the first data request into two different requests comprising a power-on request and a second data request, wherein the second data request is to obtain data corresponding to the first data request from the second device to be transmitted to the first device and wherein the power-on request is to cause the second device to power on in response to a determination based on the stored information that the second device is in a reduced power consumption state,
wherein the first device is incapable of directly causing the second device to power on without the translation performed by the logic based on the stored information.

2. The apparatus of claim 1, further comprising a network, wherein the communication adapter is to intercept a plurality of requests for data communicated over the network to detect the request from the first device.

3. The apparatus of claim 1, wherein information corresponding to the second device is stored in the storage device before the second device is to enter a reduced power consumption state.

4. The apparatus of claim 1, further comprising a private communication channel to couple the adapter to one or more of the first or second devices.

5. The apparatus of claim 1, further comprising a shared communication channel to couple the adapter to one or more of the first or second devices.

6. The apparatus of claim 1, wherein the logic causes transmission of the data corresponding to the first data request to the first device after the second device is turned on and in response to the second data request.

7. The apparatus of claim 1, wherein the storage device comprises one or more of a network adapter memory, a main system memory, a cache, a non-volatile memory, or a hard disk drive.

8. The apparatus of claim 1, wherein the logic comprises a processor, wherein the processor comprises one or more processor cores.

9. The apparatus of claim 1, wherein the stored information is to comprise information corresponding to: power-on capabilities of the second device, identification of data stored at the second device, a shared protocol to be used for communication with the second device, and a power state of the second device.

10. The apparatus of claim 1, wherein the power-on request is to comprise transmission of at least one of a radio frequency signal and infrared signal to the second device and wherein the first device lacks a transmitter to transmit the radio frequency signal or the infrared signal.

11. A method comprising:
detecting a first data request from a first device at a second device;
determining a third device that stores data corresponding to the first data request based on stored information corresponding to the third device;
translating the first data request into two different requests comprising a power-on request and a second data request, wherein the second data request is to obtain data corresponding to the first data request from the third device; and
causing the third device to power on in response to the power-on request and a determination, at the second device based on the. stored information, that the third device is in a reduced power consumption state.

12. The method of claim 11, further comprising storing the stored information corresponding to the third device at the second device prior to the third device entering a reduced power consumption state.

13. The method of claim 11, further comprising, at the second device, intercepting a plurality of requests for data communicated over a network to detect the request from the first device.

14. The method of claim 11, further comprising turning on the second device in response to detecting the request.

15. The method of claim 11, further comprising coupling the second device and the third device via a private communication channel.

16. The method of claim 11, wherein causing the third device to power on is performed by the second device.

17. The method of claim 11, further comprising sending the data corresponding to the first data request to the first device in response to the second data request and after the third device is turned on.

18. The method of claim 11, wherein the stored information is to comprise information corresponding to: power-on capabilities of the second device, identification of data stored at the second device, a shared protocol to be used for communication with the second device, and a power state of the second device.

19. The method of claim 11, wherein the power-on request is to comprise transmission of at least one of a radio frequency signal and infrared signal to the second device and wherein the first device lacks a transmitter to transmit the radio frequency signal or the infrared signal.

* * * * *